INVENTOR.
CHARLES H. KRETSCHMER
AND HENRY J. MARTIN
BY

ATTORNEY

Oct. 27, 1959  C. H. KRETSCHMER ET AL  2,910,205
METHOD AND MACHINE FOR TAPING
Filed Dec. 16, 1957  9 Sheets-Sheet 6

INVENTOR.
CHARLES H. KRETSCHMER
BY  AND HENRY J. MARTIN

ATTORNEY

Oct. 27, 1959  C. H. KRETSCHMER ET AL  2,910,205
METHOD AND MACHINE FOR TAPING
Filed Dec. 16, 1957  9 Sheets-Sheet 7

INVENTOR.
CHARLES H. KRETSCHMER
AND HENRY J. MARTIN
BY
ATTORNEY

Oct. 27, 1959   C. H. KRETSCHMER ET AL   2,910,205
METHOD AND MACHINE FOR TAPING
Filed Dec. 16, 1957   9 Sheets-Sheet 9

INVENTOR.
CHARLES H. KRETSCHMER
BY   AND HENRY J. MARTIN

ATTORNEY

United States Patent Office 2,910,205
Patented Oct. 27, 1959

2,910,205

METHOD AND MACHINE FOR TAPING

Charles H. Kretschmer and Henry J. Martin, Saginaw, Mich.

Application December 16, 1957, Serial No. 703,184

29 Claims. (Cl. 216—21)

This invention relates to a machine and method for applying a tape to surfaces of curvilinear, rectangular or other configuration and more particularly to such a machine and method for taping folders and similar flat objects to cylindrical containers such as jars, cartons, cans, or bottles, and the like.

This invention is a continuation-in-part of the co-pending application of Charles H. Kretschmer, Jr. et al., now abandoned Serial No. 464,742 filed on October 26, 1954 on a Taping Machine. While the invention will be described in connection with the application of folders, by adhesive tape to a cylindrical container, the principles of the machine and method may be employed in connection with containers of other configurations.

For convenience in processing containers through assembly lines in which they are filled, capped, labeled, and cartoned, most food containers such as jars, cans, or bottles are generally cylindrical in shape. It has been found desirable in the merchandising of products particularly various food stuffs to attach advertising or recipe folders and the like thereto as well as the label. As far as is known, no machine has hereto been developed for applying such folders to the containers and it has been the common practice in the past to tape these folders to the containers by hand in order to properly attach the folders without obscuring the label. This practice is, of course, tedious, expensive in terms of labor-time consumed; imposes a serious delay on the production line; and is further generally inefficient, particularly since the tape must be of a sticky nature and human error and fatigue contribute substantially to incorrect and inferior taping.

Accordingly it is a primary object of this invention to provide a new and novel machine and method for automatically applying tape to containers such as jars and the like.

It is a further object of the invention to provide a new and novel machine for taping advertising folders, recipes, and similar flat objects to containers, which is highly efficient and reliable in operation, functions at a high rate of speed, and economically uses a minimum length of tape for each container.

Still another object of the invention to provide a new and novel machine which will automatically tape folders to a labeled container and which may be adjusted to accommodate containers of any height within a wide range without marring or obscuring the label.

A still further object of this invention to provide a new and novel machine and method for applying tape to containers of curvilinear configuration such as jars and bottles.

This invention further contemplates the provision of a new and novel method of automatically taping flat objects such as folders by containers of a wide variety of heights and diameters.

Still another object of this invention to provide a new and novel machine for taping folders to cylindrical containers which may be easily included in a production line as an operational step and which may be readily adjusted to apply the tape and folder to the container in any selected location.

Other objects and advantages of the invention will be particularly set forth in the claims and will be apparent from the following description, when taken in connection with the accompanying drawings, in which:

Figure 1:
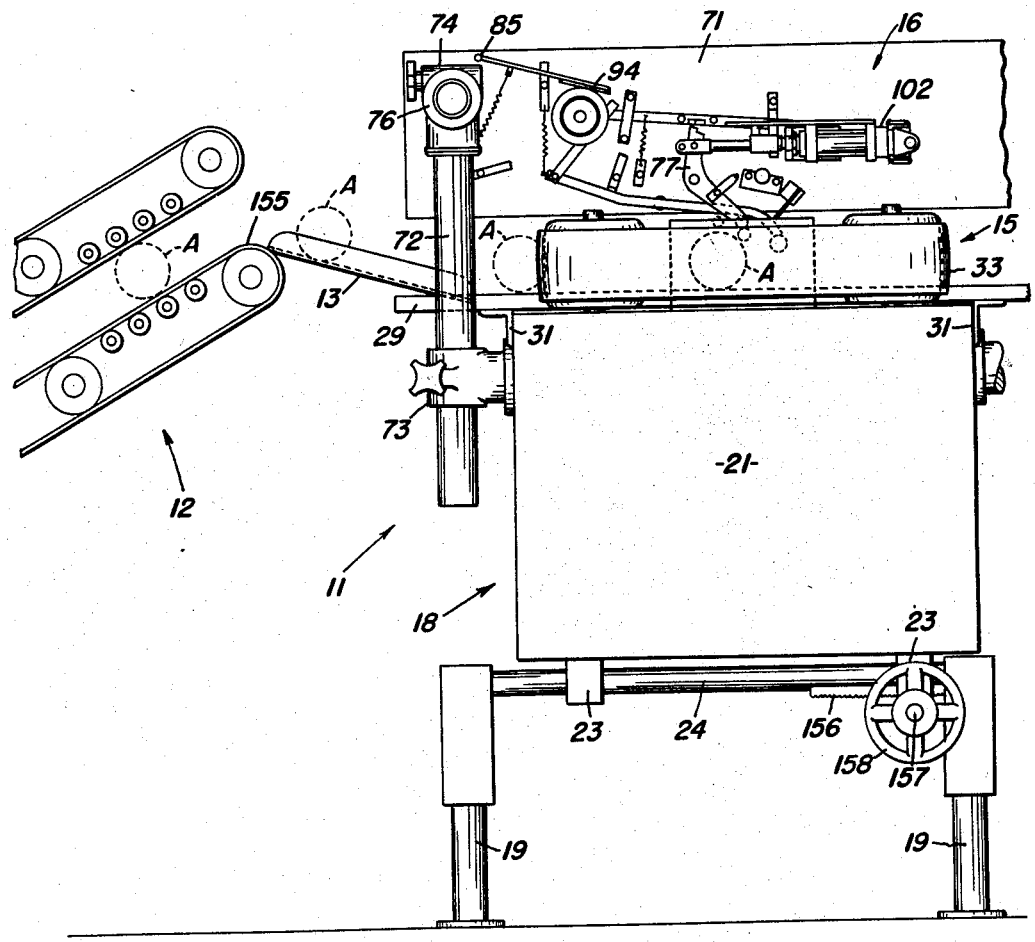
Fig. 1 is an elevation view of a taping machine constructed in accordance with the invention arranged to receive containers discharged from a labeling machine.

Referring now to Fig. 1, there is shown a taping machine constructed in accordance with the invention which is employed, particularly, to tape advertising folders, recipes and similar flat objects to containers or articles such as jars, cans, or other packages or containers. Certain principles of the machines may also be employed to tape objects other than flat sheets or folders to containers.

The taping machine indicated generally by the numeral 11, is preferably positioned within a processing or production line so as to perform the taping operation on the containers flowing through the line without interrupting or slowing down the movement of the production line. As can be seen, the taping machine is positioned adjacent the discharge end of a labeling machine, a portion of which is shown indicated generally by the numeral 12. Container or articles A leaving the labeling machine are conveyed to the taping machine by means of a runway or chute 13 supported, in any suitable manner between the two machines so as to depend angularly downward toward the taping machine.

Figure 11:
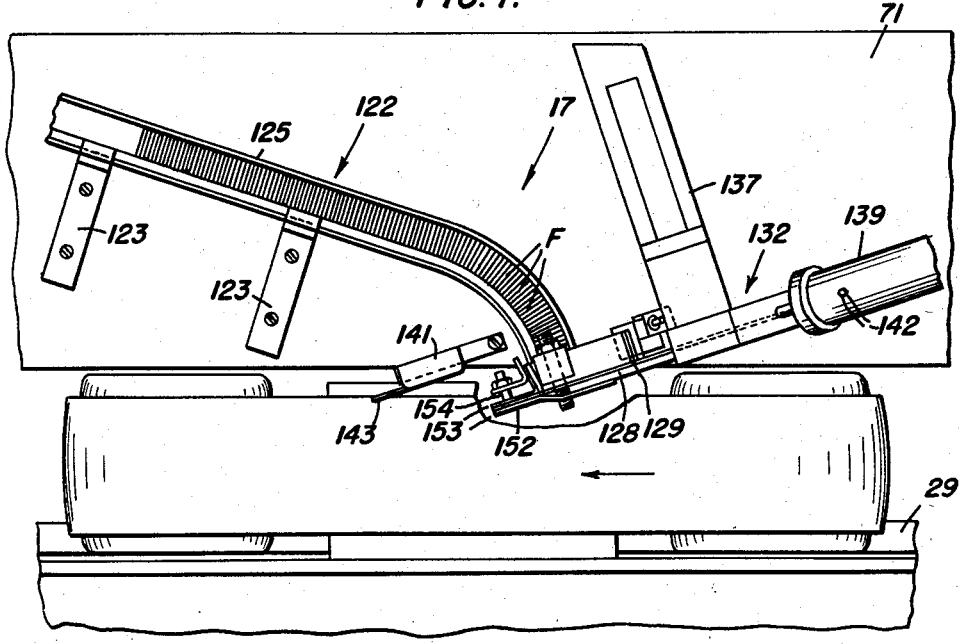
Fig. 11 is a partial side view of the taping machine illustrating the folder feeding mechanism and folder magazine.

The taping machine 11 comprises: an article conveying mechanism, designated generally by the numeral 15, for conveying an article through the taping machine; means for adjusting the article conveying mechanism to accommodate articles of various heights or widths; means for applying tape to an article, designated generally by the numeral 16; means for feeding a folder to be taped by the taping mechanism to an article designated generally by the numeral 17 and shown best in Fig. 11; and means to adjust the position of the taping machine relative to the labeling machine so as to locate the applied tape and folder to a selected position on the periphery of the article.

Figure 2:
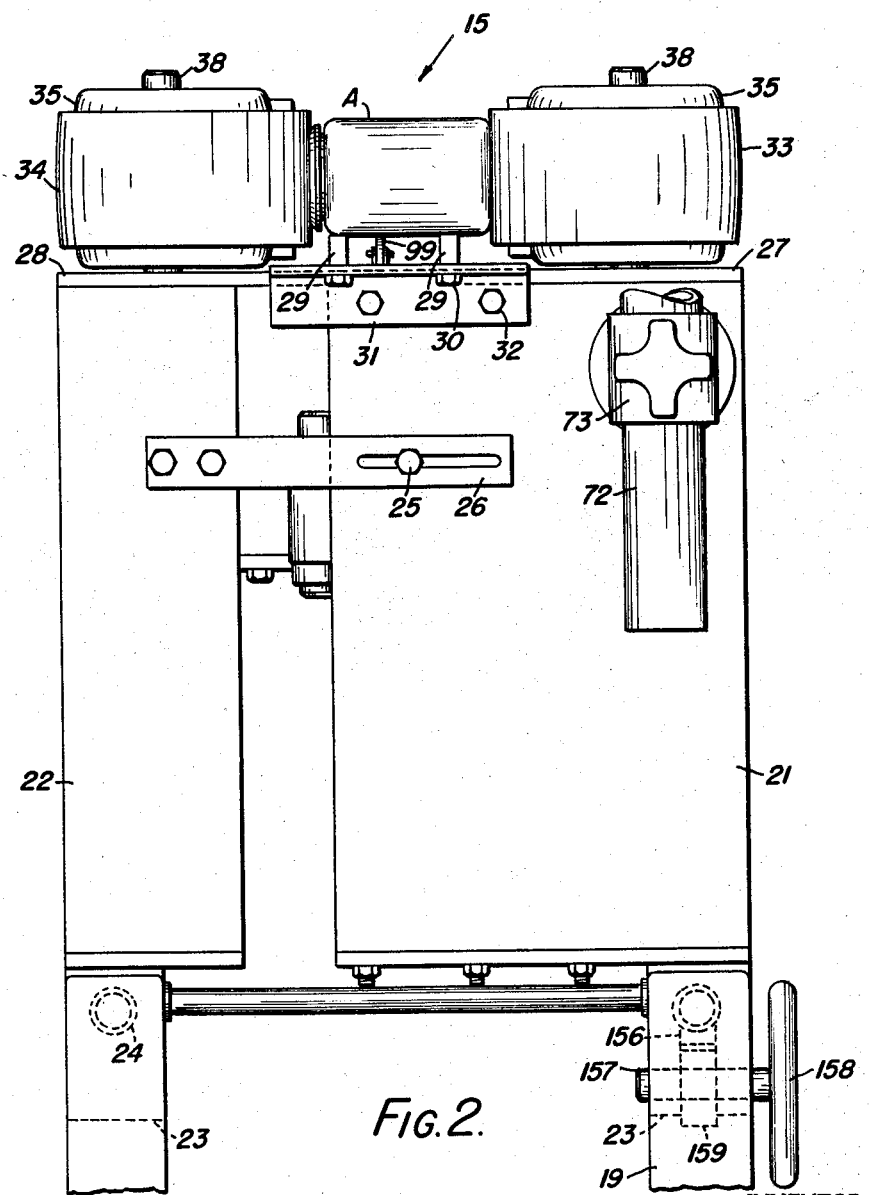
Fig. 2 is a partial end view of the taping machine of Fig. 1.
Figure 5:
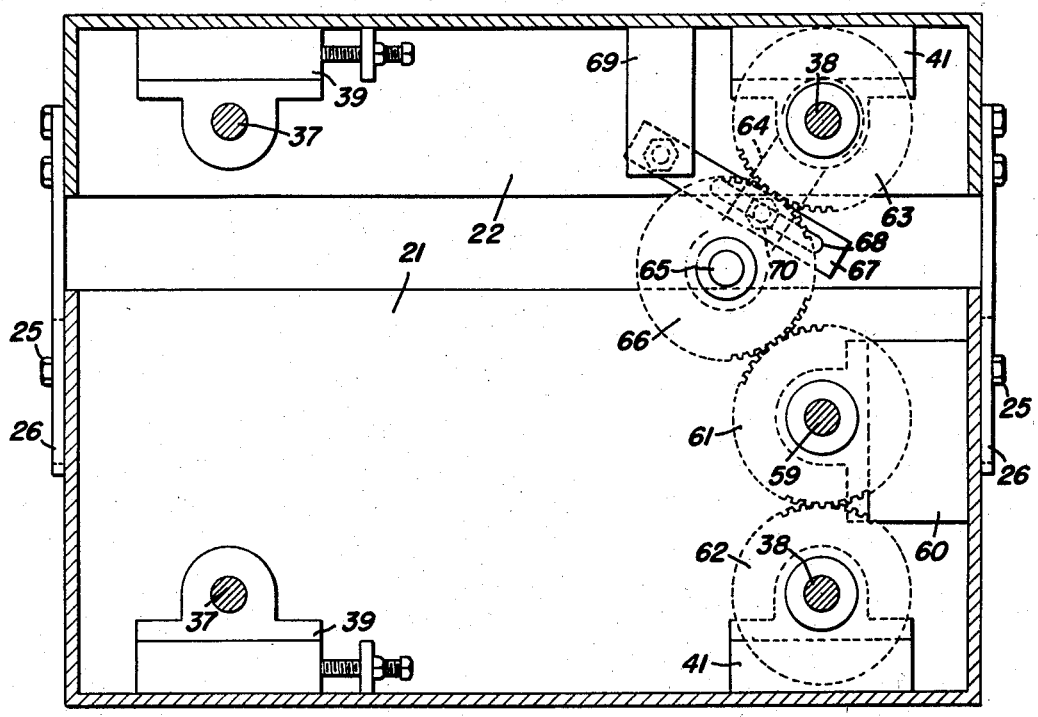
Fig. 5 is a sectional view taken substantially on line 5—5 of Fig. 3 in the direction of the arrows.

The taping machine 11 comprises a housing, designated generally by the numeral 18, which is supported on adjustable legs 19 and divided into two cooperating sections 21, 22 as shown in Figs. 2 and 5. Housing section 21 is fixedly mounted on a plurality of brackets 23 (Fig. 1) slidably movable on a cross-rod 24 supported between a pair of adjacent legs 19. Section 22 is similarly mounted on slidable brackets 23, but is connected thereto in any conventional manner such as a tongue and groove connection for free lateral movement. Section 22 is therefore arranged to move laterally to a selected position, relative to section 21, to vary the transverse dimension of the taping machine and may be secured in the adjusted position by means such as a cooperating guide bolt 25 and slotted bracket 26 at each end of sections 21, 22. The housing sections 21, 22 are preferably provided with telescoping top walls 27, 28 which maintain the sections in the proper relationships.

Article conveying mechanism

Figure 6:
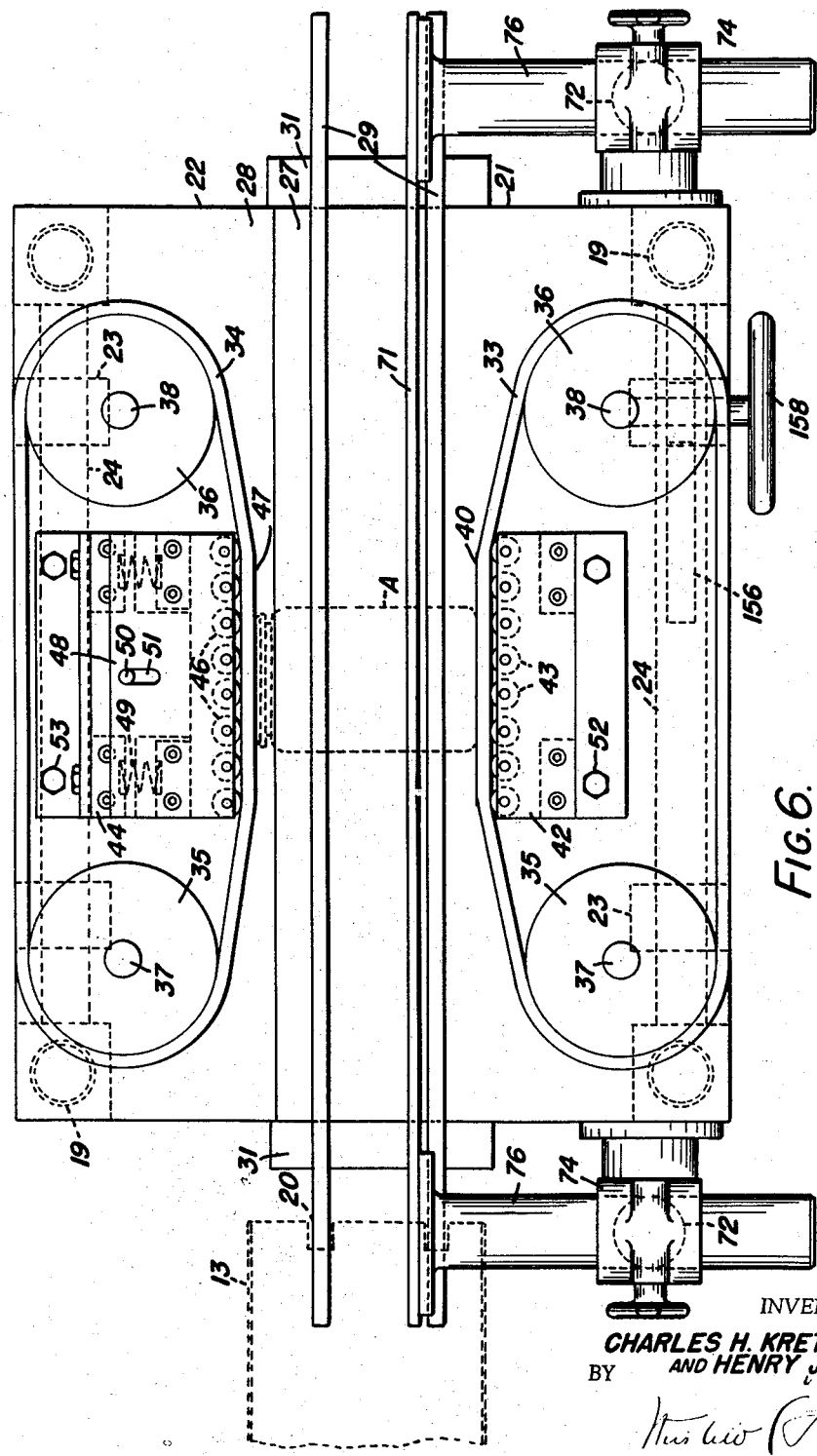
Fig. 6 is an enlarged view, partially in section, taken substantially along line 6—6 of Fig. 3 in the direction of the arrows.

As shown in Figs. 2 and 6, the article conveying means 15 comprises a pair of rails 29 arranged in spaced parallel relationship above the top surfaces 27, 28 of housing 18 for supporting an article A moving thereon. These rails are adjustably supported by means such as bolts 30 on brackets 31 which may also be adjustably positioned by means such as bolts 32 secured to the end wall of housing section 21. Thus the rails 29 may be adjustably positioned vertically and horizontally in accordance with the dimensions of the article to be conveyed through the machine. It will be noted that the chute 13 is provided with a notched end 20 which guidably receives the rails 29 therein so that the chute may move relative to the rails which remain in article conveying engagement.

Referring now to Fig. 6, in order to move an article A through taping machine 11, a pair of continuous conveyor belts 33, 34 are arranged in opposed relationship above the top surface 27, 28 of housing 18. Each of the conveyor belts 33, 34 is drivably positioned on a pair of driving drums 35, 36 supported on shafts 37, 38 rotatably mounted in bearing supports 39, 41 (Figs. 3, 4) respectively.

Belt 33 (Fig. 3) is pressed outwardly to provide a flat portion 40 extending parallel to rails 29 by a roller assembly 42 suitably mounted on the top surface 27, 28 of housing section 21 by means such as bolts 52. The roller assembly 42 contains a plurality of spaced, idler rollers 43 along which the belt 33 travels and which form the flattened belt portion 40.

On housing section 22, a roller assembly 44 has been suitably mounted, by means such as bolts 53, opposite from that of roller assembly 42 and, in a similar manner a plurality of idler rollers 46 press the belt 34 outwardly to form a flat portion 47 as shown. Rollers 46, however, are mounted on a carrier 48 mounted in the roller assembly 44 for sliding transverse movement. The carrier 48 is loaded into belt pressing engagement by means of springs 49 and its movement is guided by means of pins 50 connected thereto and extending through slots 51 in the frame of the roller assembly 44.

Figure 3:
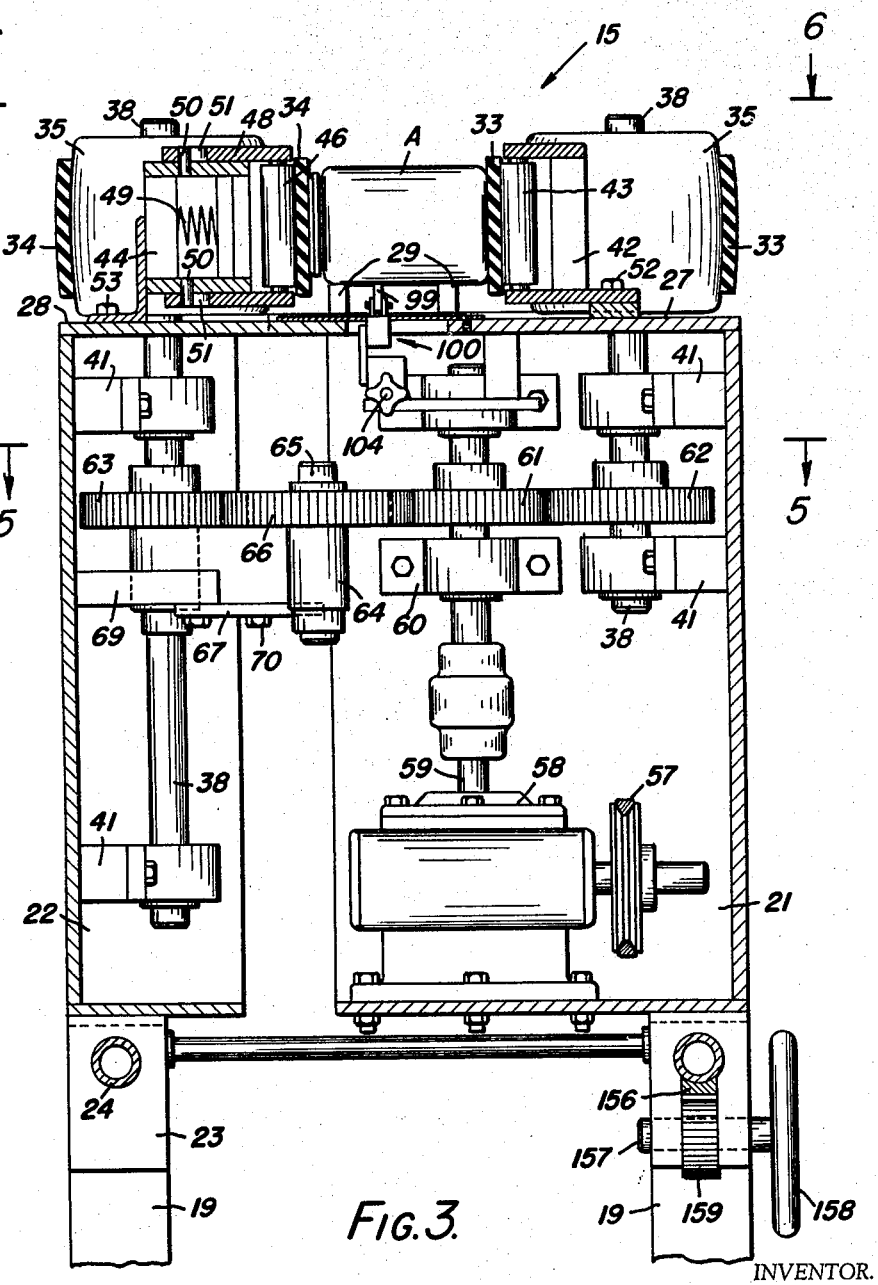
Fig. 3 is a partial end view similar to Fig. 2, partially in section, with the end wall removed to show the conveyor driving mechanism.
Figure 4:
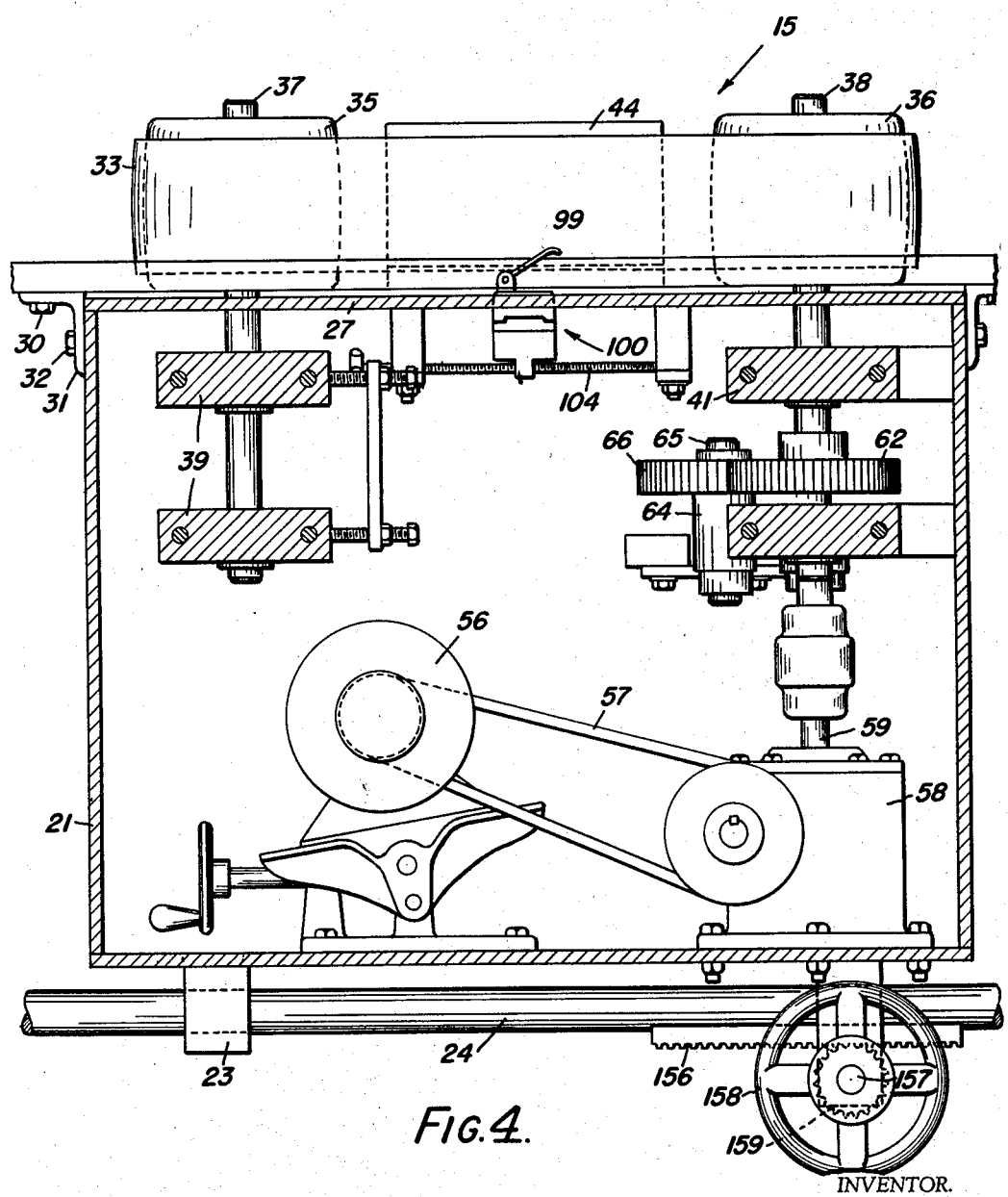
Fig. 4 is a partial side view of the taping machine of Fig. 1 with the side wall removed.

Referring now to Figs. 3 through 5, driving means for belts 33, 34 have been provided which, in the embodiment shown, comprise a motor 56 suitably mounted within the housing section 21 and drivably connected by means of belt 57 to a gear reducer 58 having an output shaft 59. The shaft 59 is journaled in bearings 60 and a drive gear 61 (Fig. 3) is mounted thereon. Drive gear 61 is positioned in driving engagement with a gear 62 on the drum shaft 38 in housing section 21. Thus driver 36 is driven through gear 62 to drive the belt 33 together with the associated idler drum 35 (Fig. 4).

In order to drive belt 34, a gear 63 (Fig. 3) is fixedly mounted on the drum shaft 38 in housing section 22 and is connected by means of pivot arm 64 (Fig. 5) to the shaft 65 of an intermediate pivotal gear 66 which is arranged to mesh in continuous engagement with gear 63. In order to retain the intermediate gear 66 in driving engagement with the drive gear 61 in any position of the housing section 22, a plate 67 having a slot 68 is pivotally mounted on a bracket 69 fixedly secured to housing section 22. As shown best in Fig. 3, a bolt 70 is threadedly engaged with the underside of the pivot arm 64 and extends through the plate slot 68. The bolt 70 may be tightened to hold the pivot arm 64 securely at a selected position relative to slot 68 and thus maintain the gear 66 in driving engagement with gear 61 in any position of housing section 22.

In the operation of the conveying mechanism 15, an article A is fed to the taping machine along the rails 29 where it is picked up by the two traveling belts 33, 34. The springs 49 on roller assembly 44 permit the belts to resiliently engage the article A and hold it securely in position clamped against rotation during its travel through the machine.

Taping mechanism

Extending vertically upward and arranged over the top of housing 18 is the support or wall 71, on opposite sides of which are supported the taping mechanism 16 and the folder feed mechanism 17 respectively. The wall 71 is supported for vertical adjustment on a pair of substantially vertical tubular members 72, releasably slidable within a clamp 73 on each side of the housing 18 as shown in Fig. 1. A clamp 74 is fixed to the upper end of each of the tubular members 72, and each clamp receives in clamping engagement a tubular member 76 projecting horizontally outward from the wall 71. With this arrangement, the wall may be moved to a selected vertical and transverse position over the article conveying mechanism 15 in accordance with the diameter and transverse dimension of the article A.

Figure 7:
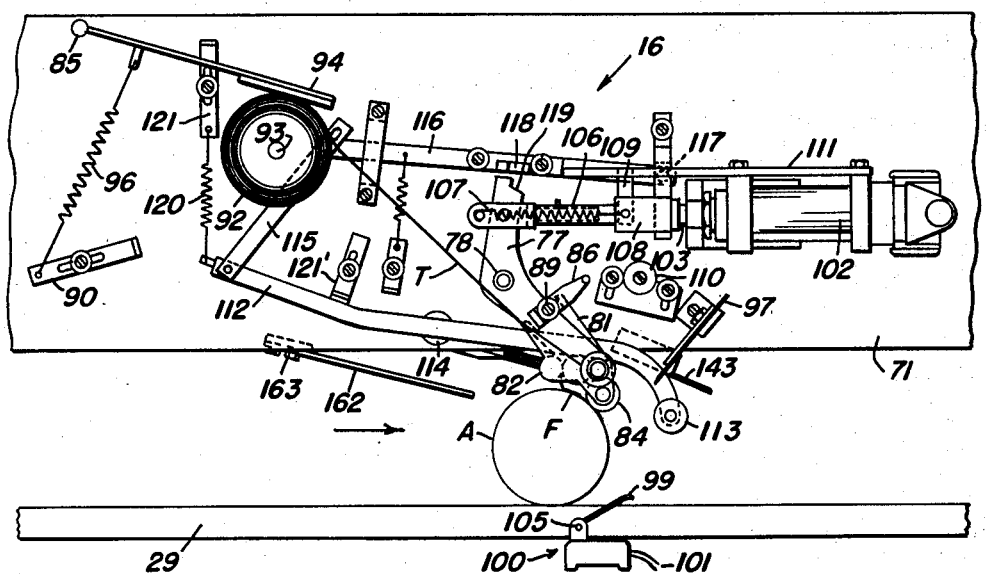
Fig. 7 is a side view of the taping mechanism showing a container in one position of its forward travel on the taping machine subsequent to its initial contact with the tape carrying means.

Referring now to Fig. 7, the taping mechanism 16 is supported on wall 71 and includes a taping arm or lever 77 which is pivotally mounted at 78. Pivoted on the lower end of the lever 77, at 79 is a plate 81 having a pair of rollers 82, 83 (Fig. 8) rotatably mounted on the lower corner toward the forward part thereof. A third roller 84 is also mounted on the foremost lower corner. A slotted bracket 86 is adjustably mounted by means of bolt 87 on lever 77 adjacent the upper end of plate 81, and has attached thereto one end of a spring 88. The other end of the spring 88 is fixed to the upper end of plate 81 so as to bias the plate in a generally clockwise direction as viewed in Fig. 8. Carried on the side of the taping lever 77 and upon which plate 81 is mounted, is a pin 89. The pin is arranged to extend between the projections of a wide mouthed notch 91 in the rearward end of plate 81, as viewed in Fig. 8, so as to limit the movement of the plate in either a clockwise or counterclockwise direction of rotation about the pivot 79.

Figure 8:
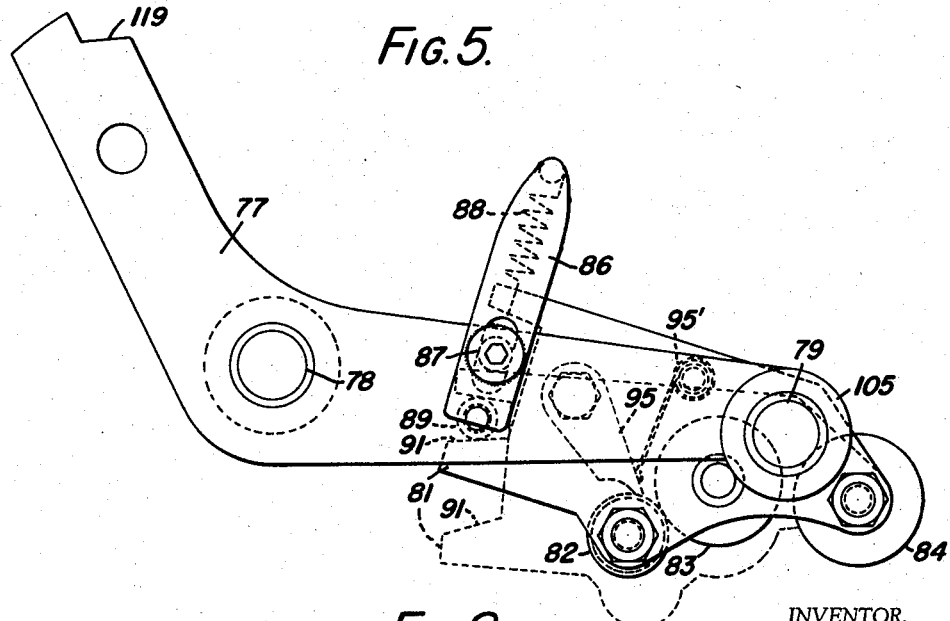
Fig. 8 is an enlarged view of a portion of the taping mechanism of Fig. 7.
Figures 12, 13:
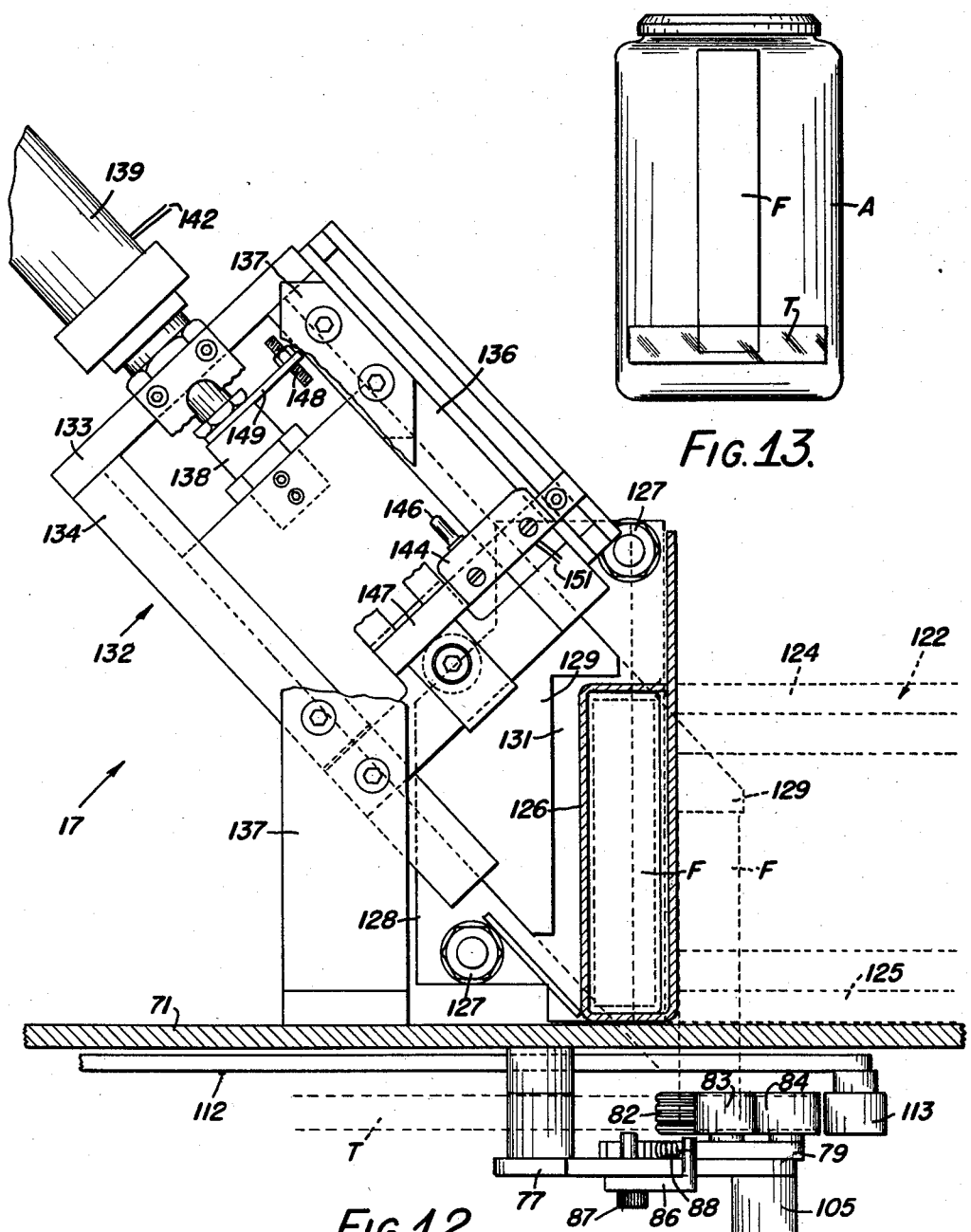
Fig. 12 is an enlarged top view, partially in section, of the folder feeding mechanism of Fig. 11.
Fig. 13 is an elevation view of a container subsequent to the taping operation.

The tape T (Fig. 7) employed in the taping mechanism is supplied from a roll 92 rotatably supported on a pin 93 carried by wall 71. A tape pressure arm 94, loaded by means of spring 96 presses against the surface of roll 92 to prevent backlash and insure proper feeding of the tape. The tape pressure arm 94 is pivoted at 85 and the pressure spring 96 may be adjusted by means indicated at 90. The tape employed may be "Scotch" tape, the underside of the tape T having an adhesive coating. Fig. 13 shows an article after completion of the taping operation. The tape T passes between the rollers 82, 83 (see also Fig. 8) with the adhesive coating side of the tape in contact with roller 82. Roller 82 is preferably circumferentially grooved so that very little of its surface is in contact with the tape, permitting the tape to pass relatively freely over the roller. The rollers 82, 83 are spaced so as to be virtually in contact or lightly in contact since they must grip and guide the tape and prevent it from slipping back toward the roll 92. The roller 82 is preferably a ratchet type roller which can rotate only in a clockwise direction and permits the tape to be pulled forwardly by the article while resisting any tendency of the tape to slip rearwardly. In Fig. 8, I have indicated a pivoted ratchet 95 which meshes with ratchet tooth (not shown) on the side of the roller 82 and a spring 95' for forcing the ratchet into engagement with the ratchet tooth.

Figure 9:
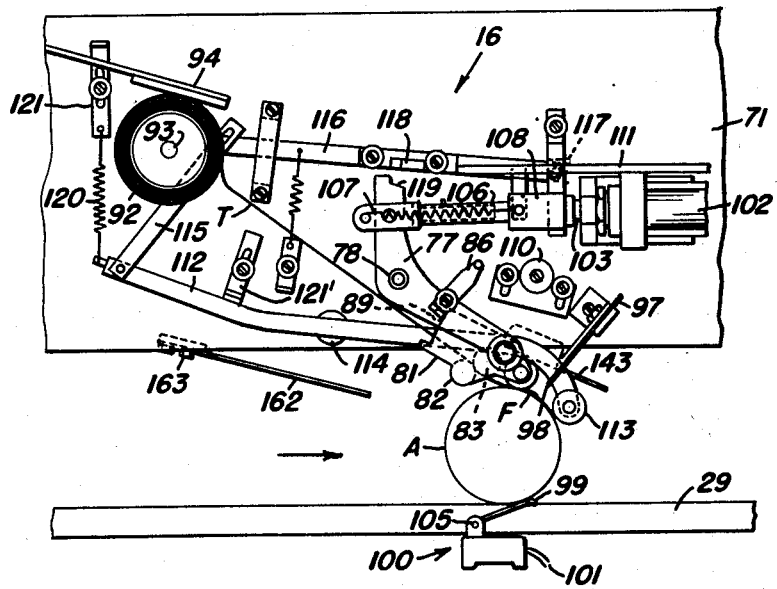
Fig. 9 is a view similar to Fig. 7, showing the container in a more advanced forward position.

Referring now again to Fig. 7, as the article A is moved along the rails 29 by the conveyor belts 33, 34 the leading end of the tape T is pressed against the article by the roller 84 which is positioned facing the non-tacky side of the tape. In this position a folder F, which has previously been extended under the wall 71 in position beneath the tape T and in a position rearwardly of the free end of the tape by the folder feed mechanism 17 is picked up by the tacky side of the tape as the article is moved along by the conveying mechanism so as to be eventually brought down and taped to the article. The free end of the tape is first applied to the article and as the article continues to move to the right as viewed in Fig. 7, tape is pulled off the roll 92. The roller 84 moves upwardly due to the contour of the article pivoting the plate 81 around its pivot 79, in a counter-clockwise direction (Fig. 9) against the action of spring 88 (Fig. 8) until the upper marginal end of the plate notch 91 engages the pin 89 on the lever 77. This action is clearly shown in Fig. 9, where the lever 77 has begun to pivot in a counter-clockwise direction around its pivot 78 as the roller 84 moves over the surface of article A.

Means have been provided in the tape carrying mechanism for severing the section of the tape T which has been applied to the article A together with the folder F. More specifically, a transversely disposed cut-off knife 97 having a cutting edge 98 is rigidly but adjustably carried by a clamp mounted on the wall 71 forwardly of the roller 84 as shown clearly in Figs. 7, 9 and 10. As the article moves past the knife, means have been provided for raising the tape against the cutting edge of the knife and sever the trailing part of the tape to be applied to the article from the main tape portion. This action is automatically initiated by a contact arm 99 (Figs. 7 and 9) of a conventional type of microswitch, designated generally by the numeral 100.

The microswitch is located between the rails 29 on the top wall of housing 18. The microswitch is connected by means of conductors 101 to an electrically operated cylinder 102 of any suitable type mounted on the wall 71 having a plunger 103 arranged to move reciprocally in the cylinder. For instance the cylinder may be of the pneumatic type which is provided with an electrically operated solenoid which controls the direction of flow of pressurized fluid in to and out of the cylinder. If desired, the microswitch 100 may be adjustably mounted on a rotatable, threaded shaft 104 (Fig. 4) to permit the microswitch to be adjustably positioned longitudinally of and parallel to the rails 29.

The contact arm 99 is pivotally mounted at 105 and when depressed by the article A (Fig. 9), as it is fed along the rails, a pair of contacts (not shown) in the microswitch are bridged to energize the solenoid in the cylinder 102 from a suitable source of power (not shown) and admit air, for example, into the cylinder. The plunger 103 is pivotally connected to one end of link 106, the other end of which is pivotally connected to the upper end of lever 77. The plunger is biased to its retracted position in cylinder 102 when pressure is released from the cylinder by a pair of springs 107 connected between the upper end of lever 77 and a guide bracket 108 fixed on the wall 71. The link 106 has an upstanding stud 109 fixed thereto which travels within a slot formed in an arm 111 suitably fixed to the wall 71 to guide the link 106 in its reciprocating movements. Thus, when the article A depresses the contact arm 99 of the microswitch 100, the plunger 103 is actuated to pivot lever 77 in a counter-clockwise direction, as viewed in Figs. 9 and 10, and raise the following part of tape forward of the folder F against the cutting edge of knife 97. The trailing part of the tape with the folder F attached to it is thus severed from the main portion of the tape. This action is possible because the roll part of the tape is held by rollers 82, 83 and the leading edge of the tape has already been secured to the article and is held by roller 113 as will presently appear.

In order to arrest the counter-clockwise movement of lever 77, a buffer roll 105 (Fig. 8) is provided at the forward end of the lever 77 above and between the rollers 83 and 84 and engages a cooperating buffer or stop roll 110 suitably attached to wall 71 to limit of travel of the lever as it moves upward to bring the tape T into engagement with the knife. Preferably both of the buffer rolls 105, 110 are composed of a resilient material such as rubber to absorb the shock of contact. As will be seen from Fig. 7, the buffer or stop roll is carried by a slotted plate attached to the wall 71 by screws. The position of the stop roll can be thus adjusted.

It should be understood that the microswitch 100 must be placed sufficiently forward of the point where the roller 84 leaves the article so that a minimum length of tape will be provided rearwardly of the folder F. However, as the article A is moved forwardly through the taping machine, the roller 84 would normally lie rearward of the diameter of the article normal to the rails. At the time the tape is severed it is held somewhat taut between the portion of tape already adhesively applied to the article and the rollers 82, 83 and a clean severance of the tape is accomplished. This action would permit the lever 77 to pivot in a clockwise direction and return to the original position of Fig. 7, due to the action of springs 107. The roller 84 would then be in contact with the trailing end of the tape and the article. If this is permitted to happen, a portion of the tape rearward of the folder might be pressed into contact with the article by the roller 84. In other words the roller 84 must be held clear of the tape and the article and prevented from returning to the position of Fig. 7 prior to severance and until the operation has been completed.

Means have therefore been provided whereby the lever 77 is prevented from moving back to its normal position (the position of Fig. 7) after the article has passed the microswitch 100. More specifically, a sealing arm 112 carrying the sealing roller 113 at its lower, forward end is pivotally mounted at 114 on wall 71. The sealing arm 112 is connected at its other end by a pivoted and slotted link 115 to a latch bar 116 pivotally mounted at 117 on the wall 71. The bar 116 is provided with a latch 118 projecting outwardly with respect to the bar 116 arranged to engage a corresponding notch 119 in the upper end of lever 77. The sealing arm 112 is biased in a clockwise direction around the pivot 114 by means of a spring 120, the other end of which is secured to an adjustable slotted bracket 121 carried by the wall 7. An adjustable stop 121' limits the movement of sealing arm 112 in a clockwise direction about pivot 114 and positions the sealing roller 113.

As the article A moves forwardly and the roller 84 moves over the upper portion of the article (compare Figs. 7 and 9), the sealing arm roller 113 contacts the leading edge of the tape to be secured to the article, pressing it into sealing engagement and holding it during severance of the tape. Continued movement of the article raises the roller end of the sealing arm 112 moving it counter-clockwise about the pivot 114. As the sealing arm 112 is pivoted, counter-clockwise, the link 115 moves downward pulling the latch bar 116 with it to the end so that the latch 118 will locate within the lever notch 119 (see the dotted line position of lever 77, Fig. 10), preventing the return of the lever 77 to its normal position between the time when the roller 84 passes the vertical axis of the article and after the article has passed the microswitch which would normally allow the springs 107 to restore the lever 77 to the position of Fig. 7.

After the tape has been severed by the knife 97, the sealing arm roller 113 due to the spring 120, continues to engage the tape and presses the trailing end into engagement with the article. After the sealing roller 113 passes the diameter of the article A, there is an upward push on link 115 which actuates bar 116 against the action of a spring 116 to lift latch 118 out of engagement with notch 119 and permit the springs 107 to restore the lever 77 to the position of Fig. 7 ready to be actuated again when the next article engages microswitch arm 99.

Folder feed mechanism

Figure 10:
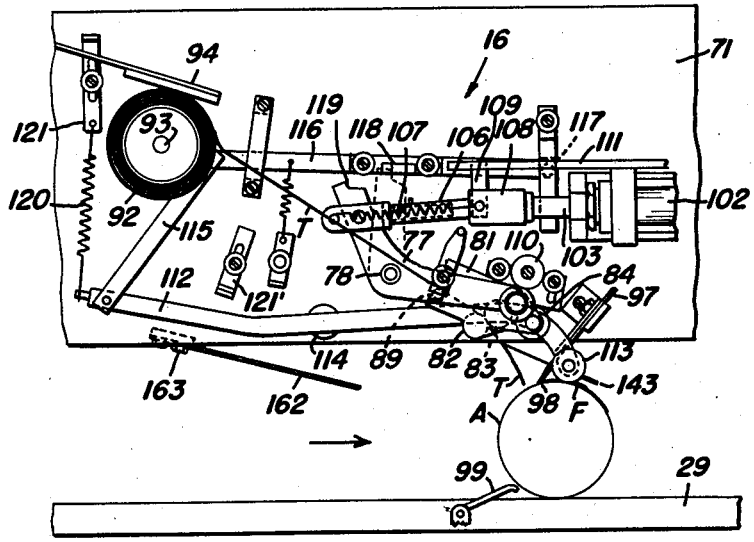
Fig. 10 is a view similar to Fig. 7 showing the container in a still more advanced forward position in which the tape has been severed from the taped article.

It will be noted in Fig. 10, that the lower or leading end of the tape T depends downwardly after severance from the article so as to lie in a position to repeat the above described taping operation on the succeeding article A. In order to locate another folder F in the proper position below rearwardly of the leading end of the tape, means have been provided, which are actuated by article A to feed a folder F into the previously described taping position prior to contact of the article with the leading edge of the tape T. More specifically, as shown in Figs. 11 and 12, the folder feed mechanism 17 is supported on the side of wall 71 opposite from that of the tape carrying mechanism 16.

The folder feed mechanism 17 comprises an inclined magazine or chute, designated generally by the numeral 122, which is suitably mounted on wall 71 by means such as angle brackets 123. The magazine 122, the lower end of which is arranged at substantially a right angle to the path of articles A, comprises a pair of spaced apart channels 124, 125 arranged to accommodate a stack of folders F. The magazine 122 is inclined arcuately so as to gravity feed the folders F to a guide sleeve 126. The guide sleeve is substantially rectangular in cross-section dimensions in accordance with the dimensions of the folder. The guide sleeve is suitably fixed, by means such as welding, to studs 127 on a laterally extending plate 128 on the wall 71. The lower edge of the guide sleeve 126 is spaced from the plate 128 a distance at least the thickness of a folder F, thereby defining a slot between the bottom of the guide sleeve 126 and the top surface of the plate 128.

In order to move folders singly from the magazine 122 to the taping position, a feed plate 129 having a right angle notch 131 in its end adjacent guide sleeve 126, is mounted for reciprocal sliding movement within a rectangular guide frame, designated generally by the numeral 132 and is operatively associated with the magazine 122. The guide frame 132 contains a crosspiece 133 secured to side plates 134, 136 which are supported in the position from wall 71 by means of an angle bracket 137. The feed plate 129 is moved by means of the plunger 138 of an electrically operated cylinder 139 preferably similar to the cylinder 102 of the taping mechanism. As the feed plate 129 moves angularly downward, as viewed in Fig. 12, it enters the slot between the bottom of guide sleeve 126 and the plate 128 and the margins of the notch 131 engage the lower-most folder pushing it over the plate 128.

The cylinder 139 is supported on the crosspiece 133 and the actuation of its plunger is arranged to be initiated by a microswitch 141 (Fig. 11) suitably supported from wall 71 and electrically connected by means of conductors 142 to solenoid operated valves which control the flow of air to the cylinder 139. The microswitch 141 is provided with a contact arm 143 which when moved upwardly by an article A controls contacts in the microswitch to energize the circuit conductors 142 through a suitable source of power (not shown) and the result is movement of the plunger 138 outwardly from the cylinder. In order to rapidly return the plunger 138 and to accurately determine the limit of its forward movement, a microswitch 144 (Fig. 12) having a contact button 146 is positioned on a crosspiece 147 on the frame 132. An actuating screw 148 is mounted on an arm 149 carried by the plunger 138 so as to depress the button 146 during the downward movement of the plunger. The screw 148 is adjustably threaded so as to determine selectively the point on the plunger travel at which it engages the button 146.

The microswitch 146 is connected by means of circuit conductors 151 to the solenoid of one of the solenoid valves of cylinder 139. The plunger of cylinder 139, unlike the plunger of cylinder 102 is double acting. This microswitch 141 initiates the forward movement of the plunger 138 while microswitch 144 initiates its rearward movement. By the use of the adjustable pin 148 the throw of feed plate may be adjusted. The folder F may thus be pushed out of the bottom of the guide sleeve and properly positioned with respect to the tape.

As shown in Fig. 11, a clip 152 is disposed in front of the guide sleeve 126 and is suitably mounted on wall 71. Plate 128 carries a pair of leaf springs 153 spaced apart a distance slightly less than the thickness of a folder F. The spacing of the leaf springs may be adjusted by means of a screw 154. Thus the clip 152 will receive a folder F when it is pushed out from beneath the guide sleeve 126 by the notched end 131 of the sliding plate 129 and will grip it sufficiently to hold it in position adjacent and beneath the depending leading end of the tape T prior to the arrival of an article A (Fig. 7). However, the gripping pressure of the leaf springs 153 is not sufficient to prevent the clip from releasing the folder when the latter is pulled from the clip by the tape.

In the operation of the folder feed mechanism 17, the preceding article A which has been taped in the manner described above, moves forwardly (to the left in Fig. 11) until it contacts the contact arm 143 of microswitch 141. This energizes one of the solenoids associated with cylinder 139 resulting in outward movement of the plunger 138, carrying with it the feed plate 129 and moving the feed plate into the slot or space between the bottom of the guide sleeve 126 and the top surface of plate 128. The margins of the plate notch 131 contact the lowermost folder F pushing it outwardly into engagement with and between the leaf springs 153. At the predetermined limit of forward travel of the plate 129, the switch button 146 is depressed by screw 148 to initiate movement of the plunger 138 quickly back to its retracted position. Thus, the folder F is held by the leaf springs beneath tape T until the taping mechanism is actuated by the succeeding article to bring the tape down on the folder and tape it against the article A as previously described. It will be particularly noted that each article A initiates the actuation which brings the folder F for the next succeeding article into position.

It should be understood that the cylinders 139 may be of any conventional type such as cylinder 102. The only difference in the illustrated embodiment is that cylinder 102 is controlled by a single microswitch 100 and its piston is single acting while the piston of cylinder 139 is double acting and controlled by two switches 141, 144.

Tape and folder locating mechanism

It will be understood that when the articles A arrive at the rails 29 from the chute 13, the position of the article when grasped by the conveying mechanism 15 will determine the location at which the folder F is taped to the article. It is important that the folder F be located on the container in a particular desired position so as not to obscure important parts of the label. Moreover, each folder F should be positioned on each container in the same position with relation to the label.

In Fig. 1 we have shown the discharge end of a standard labeling machine. As is well known in the art of labelling machines, the containers A are positively rolled by the belts shown so that each container reaches the point 155 with the exact same part of the label over the point 155. After the container is grasped by the conveyor belts 33, 34, the container no longer rotates. Therefore, in order to place the folder on each container in the same and the desired relation to the label, we have provided means for changing the distance between the point 155 and the point at which the conveyor belts 33, 34 pick up the container. That is by changing the rolling distance from the point 155 we can predetermine the position of the folder on the container. Transverse adjustment of the folder position on the container may be made by adjusting the position of the wall 71.

More specifically, a rack 156 is secured, as shown in Figs. 1 and 3, to the underside of the rod 24. A stub drive shaft 157, to which is secured an operating handwheel 158, is rotatably supported transversely of the taping machine. As previously described, the housing 18 is supported in brackets 23 adapted to slide on rods 24. The shaft 157 drives a pinion 159 which engages the rack 156 and when the hand wheel 158 is rotated, the housing 18 will move in the appropriate direction along the crossrods 24.

As previously discussed, the lower end of the chute 13 which is supported on the taping machine 11 has two notches 20 which slidably receives the rails 29. This permits the chute to move longitudinally relative to the rails while remaining in article discharging engagement therewith. Thus when it is desired to predetermine the angular position of rotation at which the article A is picked up by belts 33, 34 the position of the machine housing 18 is shifted by means of hand wheels 158 to either increase or decrease the length of the path and consequently the number of rotations through which the article travels from the point 155 of the labeling machine to the conevyor belts 33, 34, and this adjustment predetermines the position of the folder with relation to the label.

Taping machine operation

The machine has thus a number of adjustments so as to adapt it to varying conditions of operating and a range of sizes of containers; the rolling distance of the containers may be adjusted to position the folder in the desired relation to the label; the wall may be adjusted laterally to position the folder properly with relation to the height of the container; the feed belts may be adjusted transversely to accommodate containers of different heights by adjusting housings 21 and 22 with relation to each other; and the height of the wall may be varied with relation to the rails 29 to accommodate containers of different diameters.

As the article A rolls out of the chute 13 on to the rails 29, it is gripped between the conveyor belts 33, 34 and held securely and resiliently therebetween by means of the spring biased rollers 46 on the roller assembly 44 associated with belt 34. In order to insure that the article is held in contact with the rails 29, a hold down spring 162 (Fig. 9) is secured at 163 to wall 71 and presses the article against the rails as it moves forwardly.

As the upper marginal end of notch 91 in plate 81 strikes pin 89 on the lever 77, the lever is pivoted in a counter-clockwise direction against the action of springs 107 as the roller 84 moves along the surface of article A. The return of lever 77 to its normal position, which would occur as the roller 84 moves past the center of the article, is prevented by the latch 118 as the sealing arm roller 113 is contacted by the article just prior to depression of the microswitch contact arm 99 by the article in the previously explained manner.

The lever 77 need only be momentarily held since the switch 100 is immediately tripped and the plunger rod 103 is moved outwardly by the cylinder 102, pivoting the lever 77 in a counterclockwise direction and raising the tape to the knife edge 98 for severing. Once the tape has been severed, as shown in Fig. 10, the microswitch contact arm 99 is released and the cylinder 102 is actuated to return the plunger 103 to its original position. The sealing arm roller 113 presses down the trailing end of the tape as the article continues to move forwardly through the machine.

As the article A moves past the position of Fig. 10 its upper surface raises the contact arm 143 of microswitch 132 on the opposite side of the wall 71 (Fig. 11) energizing the cylinder 139 through the circuit conductors 142. The cylinder plunger 138 moves the slide plate 129 forwardly to move another folder F into the clip 152. A portion of this folder F extends under the wall 71 beneath the leading end of tape T so as to be ready for a subsequent taping operation on the next succeeding article A.

While there has been shown and described the preferred forms of mechanisms of the invention, it will be apparent that various changes and modifications may be made therein, particularly in the form and relation of parts, without departing from the spirit of the invention as set forth in the appended claims.

We claim:

—1. In a taping machine, means for moving an article to be taped through said machine, means supporting an object to be affixed to said article, tape carrying means disposed in the path of said article to press the leading end of a tape strip to the article when engaged thereby, means actuated by the article engaging said tape carrying means for pressing the tape strip to said object, a cut-off knife for severing said tape strip, and means for pressing the trailing end of the severed portion of the strip to said article.

2. In a machine for taping articles, a runway on which articles may be conveyed through the machine, support means above said runway, a lever pivotally mounted on said support means and having one end extending toward said runway, a plate pivotally mounted on said end of the lever and depending into the path of travel of said articles, means on said plate carrying a tape strip and pressing the leading end thereof onto said article when engaged thereby, a cut-off knife electrically operated, pressure fluid actuated means adjacent the opposite end of the lever for swinging the same to raise the tape strip to the knife to be cut, and means in the path of said article for pressing down the trailing end of the severed tape strip.

3. The combination defined in claim 2 in which a microswitch is disposed in said runway in the path of said articles so as to be tripped thereby and energize said pressure fluid actuated means.

4. In a taping machine, a runway on which articles may be conveyed through the machine, support means above said runway, a bell crank lever pivotal on said support means with the one end thereof extending toward said runway, a generally triangular plate pivotal on the lower end of said lever with one corner thereof normally depending into the path of travel of the articles, spring means connected between said lever and plate maintaining said plate normally in this position with another corner of said plate preceding said first-mentioned corner disposed immediately above the path of said articles, means on the last-mentioned corner of said plate carrying an adhesive tape strip with the leading end thereof extending therebeyond toward said first-mentioned corner of the plate, means on said plate for pressing the leading end of the tape down on the article when the article moves into engagement therewith, an object supported to extend under said tape between the said corners of the plate so as to be secured to the tape when the article engages the means on the first-mentioned corner of said plate and pivots the plate to swing the second-mentioned corner down toward the article, a knife for severing the tape strip to leave a trailing end on the severed portion, and means for pressing said trailing end to the article to secure the object thereto.

5. The combination defined in claim 4 in which the tape carrying means comprises a pair of engaged rollers with the roller over which the adhesive surface of said tape leads being transversely grooved.

6. The combination defined in claim 4 in which electrically operated, fluid pressure actuated means is provided adjacent the opposite end of said lever for swinging the same to raise the tape strip to the knife to be severed, and a limit switch disposed in the path of said article between said plate and knife is tripped by said article to energize the fluid pressure actuated means.

7. In a taping machine, means for conveying an article to be taped through said machine, support means thereabove, a lever pivotal on said support means and having a lower end extending to the path of travel of said article, tape carrying means on the lower end of said lever arranged to press the leading end of a tape strip to the article when engaged by the same, a cut-off knife immediately adjacent said lever above the path of travel of said article, means urging the lower end of said lever downwardly, a stop preventing movement of said lever further into the path of travel of said article, a pressure fluid cylinder including a plunger connected to the upper end of the lever and arranged to move the upper end thereof outwardly to raise the lower end of the lever to the knife to sever the tape strip, an electrically operated valve in said cylinder, a circuit therefore including means therein for operating the valve, a microswitch disposed in the path of the article to close the circuit and operate the valve to actuate the plunger, means moving between the stop and upper end of the lever after the article has raised the lower end of the lever and moved the upper end thereof away from its stop, and a lever system disposed in the path of the article for actuating said last-mentioned means and preventing said first-mentioned lever from returning to position after the article has passed the said lever, and prior to the time the microswitch is tripped.

8. The combination defined in claim 7 in which the said plunger rod has a sleeve pivotal on the outer end thereof and a pin secured to the upper end of the lever has a pin in said sleeve to transmit the movement of said rod on said lever.

9. The combination defined in claim 7 in which said means for moving between the stop and upper end of the first-mentioned lever includes a bar having a pin and slot connection with said lever system, spring means normally urging said bar into position between said stop and the lever, and a second spring means overcoming said first-mentioned spring means and normally holding the said lever system in the path of said article.

10. The combination defined in claim 9 in which said lever system includes a lever disposed in the path of said article and riding thereon to press the trailing end of the severed portion of the tape strip to the article.

11. In a machine for taping folders to jars, means moving said jars through the machine, adhesive tape carrying means disposed in the path of travel of said jars for pressing the tape thereon, a cut-off knife above the path of travel of said jars, electrically operated means moving said tape carrying means to raise the same toward said cut-off knife and sever the tape, a switch arranged in the path of travel of said jars to energize said electrically operated means, a magazine having a stack of folders therein, means for holding an individual folder under said tape carrying means so that it will be engaged by the tape, and selector means removing folders from the magazine individually and feeding them to said holding means in timed relation with the travel of the jars through the machine.

12. In a machine for taping folders to jars, means moving said jars through the machine, a support bracket, tape carrying means thereon disposed in the path of travel of said jars, a stationary cut-off knife, electrically operated means moving said tape carrying means toward said knife to sever the tape, switch means in the path of travel of said jars and actuated thereby to operate said electrically operated means, a magazine including a stack of folders therein, the magazine having a slot adjacent the lower end thereof, a clip mounted on said magazine adjacent said slot, a dispensing plate movable into the slot in the magazine to push an individual folder from said magazine out said slot into said clip, electrically operated means actuating said dispensing plate, and switch means operating said last-mentioned means in timed relation with the travel of the jars through the machine.

13. The combination defined in claim 12 in which said dispensing plate is shaped to engage both a side and end of a folder and slides at an angle relative to the path of travel of said jars so that said folder is moved laterally as well as forwardly to said clip from a position outwardly of said tape to a position in which it is thereunder and will be pressed to the jar thereby.

14. The combination defined in claim 12 in which said electrically operated means for moving said tape carrying means comprises a double acting pneumatic cylinder having a solenoid controlled valve and a plunger rod connected to said tape carrying means, said rod has a trip thereon closing said second-mentioned switch means when the rod moves outwardly to move the tape carrying means toward the knife, said electrically operated means for actuating the dispensing plate comprising a double acting pneumatic cylinder having a solenoid controlled valve and a plunger rod connected to said plate, a rib provided on said plunger rod, and a microswitch provided in the path of travel of said trip and electrically connected to said valve to operate the same and return the plunger rods in said cylinder to normal position.

15. In a machine for taping folders to articles having a curvilinear surface, an inclined chute down which said articles are fed, a pair of oppositely disposed, oppositely driven, conveyor belts with the peripheral edges thereof within said chute for gripping the articles and conveying them through the machine, a support bracket above said belts, a lever pivotal on said bracket, a plate carrying a strip of tape leading from a supply roll pivotal on said lever and arranged in the path of travel of said articles, means supplying folders individually in timed relation with the travel of said articles through the machine to a position in which they extend under said tape carrying plate, a roller on said plate in position to be engaged by said articles and ride up on the curvilinear surface of an article to press the leading end of the tape strip to the article, a knife on said bracket immediately beyond said plate, electrically operated means moving said lever to said knife to sever the tape, a switch in said chute in the path of travel of said articles and tripped thereby to actuate said latter means, a second lever pivotal on said bracket and depending into the path of said articles for riding up on the curvilinear surface of an article and pressing down the trailing end of the severed portion of said tape strip, and means connected to said second-mentioned lever preventing the return of said first-mentioned lever when it would be permitted to return by the curvilinear surface prior to the closing of said switch.

16. A method of taping folders to jars comprising feeding a jar into engagement with the leading end of a tape strip and pressing the same to said jar, pressing the tape into engagement with the folder almost simultaneously, severing the tape strip to leave a trailing end on the severed portion, and pressing the said traling end to the jar.

17. A method of taping objects to articles comprising, moving articles through a path of travel, feeding an article into engagement with one end of a tape strip and pressing the same to the article, pressing the tape into engagement with the object, and severing the tape strip to leave a trailing end on the severed portion and pressing the trailing end to the article.

18. A method of taping objects to articles which comprises moving the articles through a path of travel to an object applying position, adhesively securing said object to a tacky tape supplied from a roll thereof, securing the free end of the tape with the object carried thereby to the article, severing the tape from the roll to provide a strip thereof and thereafter applying the trailing end of the strip to said article.

19. A method in accordance with claim 18 in which the tape is pulled from the roll when the free end of the tape is applied to the article and the article continues to move.

20. A method of taping objects to containers having labels thereon affixed thereto by a labeling machine, said labeling machine having a point of discharge at which the containers are presented with the labels always in the same position with respect to said point, said method comprising moving the articles from said point of discharge through a path of travel to an object applying position, applying tacky tape with the object adhesively secured thereto to said containers and adjusting the length of said path of travel at the beginning of a run of containers so that during said run the objects will be applied to each of the containers of said run in a predetermined desired relationship to the label.

21. A method in accordance with claim 20 in which the containers are cylindrical and roll during movement through a portion of said path of travel and are held against rolling movement during the taping of the object to the container.

22. A method in accordance with claim 20 in which the containers are held against turning movement during the application of the objects thereto and in which the tape is supplied from a roll thereof, a strip of tape being then cut from the roll by cutting the tape on the following side of the object and the following end of the strip then being pressed into adhesive contact with the container.

23. In a taping machine for taping an object to an article, means carrying a tape strip, means holding an object adjacent a tacky side of said tape strip out of engagement therewith, means for pressing one end of the strip to the article and for pressing the tape strip to the object, means for severing the tape strip, and means for pressing the trailing end of the severed portion of the strip to said object.

24. The combination defined in claim 20 in which said means pressing the tape strip to the object is actuated by engagement of the article with the tape strip carrying means.

25. In a taping machine for taping objects to articles with adhesive tape, means supporting a tape strip, a magazine having objects therein to be taped to said articles, selector means moving an object from the magazine to a position adjacent the adhesive side of the tape out of engagement therewith, and tape carrying means taping the objects to the articles.

26. A machine for applying objects to cylindrical containers comprising, in combination, a labeling machine having a discharge end, an object applying machine, said machines being mounted in cooperative relation and having a chute between them down which the containers roll from said discharge end to said object applying machine, said labeling machine being of the type in which the containers reach said discharge end with the labels always in the same relationship to said discharge end, means including a tacky tape roll for applying an object to each of a series of containers, said means including means for cutting off a strip of tape from said roll and means for applying said strip together with the object to a container, said containers moving through a path of travel which includes said discharge chute from said discharge end to the tape applying means and means for varying the length of said path of travel to vary the position at which said object is applied to the containers with relation to the container label.

27. A machine in accordance with claim 26 in which the means for varying the length of said path of travel comprises means for moving said tape applying means toward and away from said discharge end.

28. A machine in accordance with claim 26 in conveying means are provided for urging the containers through a part of said path of travel, said conveying means grasping each of the containers at both ends and preventing them from rolling at least during the tape applying operation.

29. A machine for applying objects to containers comprising, in combination, means including a tacky tape roll for applying an object to each of a series of containers, said means including means for cutting off a strip of tape from said roll, means for applying said strip together with the object to a container, means for presenting containers to the applying means successively with the containers always in the same position with relation to the applying means, spaced conveying means engaging the containers at each end and moving them from a machine entrance to the applying means and means for changing the position on the containers at which said object is applied.

References Cited in the file of this patent
UNITED STATES PATENTS

| | | |
|---|---|---|
| 2,069,872 | Burns | Feb. 9, 1937 |
| 2,107,311 | Strickler | Feb. 8, 1938 |
| 2,515,130 | Locke et al. | July 11, 1950 |
| 2,652,166 | Johnson | Sept. 15, 1953 |